INVENTOR.
Joseph E. Murphy
BY
Paul J. Ethington
ATTORNEY

Aug. 7, 1962    J. E. MURPHY    3,048,764
TRANSISTOR CONVERTER CIRCUIT
Filed Dec. 20, 1960    2 Sheets-Sheet 2

INVENTOR.
Joseph E. Murphy
BY
Paul J. Ellington
ATTORNEY

United States Patent Office … 3,048,764
Patented Aug. 7, 1962

3,048,764
TRANSISTOR CONVERTER CIRCUIT
Joseph E. Murphy, Cudahy, Wis., assignor to General Motors Corporation, Detroit, Mich., a corporation of Delaware
Filed Dec. 20, 1960, Ser. No. 77,085
13 Claims. (Cl. 321—2)

This invention relates to power supply converter circuits including a transistor oscillator and a rectifier for converting a low direct current potential to a higher direct current potential. More particularly, this invention is an improvement over the converter circuit disclosed and claimed in copending application Serial No. 858,368 filed December 9, 1959 by Joseph E. Murphy et al. and assigned to the assignee of this invention.

In accordance with this invention, there is provided a converter circuit with a transistor oscillator which affords high efficiency operation with variable loads and which is capable of starting oscillations under load. This is accomplished by a transistor oscillator, coupled through an output rectifier to a load, in which the load current is fed back to the input circuit of the conductive transistor so that the driving power is proportional to the magnitude of the load. The invention also provides a feedback circuit which supplies load current to the transistor input electrodes independently of any intermediate tap on the feedback winding. Thus an untapped feedback winding may be used and will require only half the number of turns of a center tapped winding to produce the switching voltage for the transistors. This is accomplished by a feedback circuit which interconnects the secondary winding, the load and the transistor input electrodes in series through a pair of rectifier elements or diodes which are connected back-to-back across the feedback winding and which may be separate or a part of the output rectifier. In one embodiment, the feedback winding is connected in this series circuit and the load voltage is produced by the summation of the voltages developed by the batery, feedback winding, and secondary winding. In another embodiment, the feedback current from the load circuit may be excluded from the feedback winding so that the feedback winding need only supply switching voltage for the transistor input electrodes. This is accomplished by reversing the relative winding direction of the feedback and secondary windings. This circuit has the further advantage that a resistance-capacitance network may be connected with the input electrodes of the transistors to eliminate switching transients across the input and output electrodes of the transistors.

In other embodiments of the invention, the converter circuit is especially adapted to supply two or more loads at different voltages in succession where it is desirable to maintain oscillations during the transition from one output voltage to another. This presents a problem, especially when filter condensers are connected across the output terminals, since the voltage across the condenser tends to back-bias the diodes and the feedback current is blocked and oscillations cease until the condenser discharges to a voltage less than the battery voltage. In one embodiment, this is overcome by using a center tapped feedback winding with the battery connected between the center tap and the common electrodes of the transistors to supply a small amount of input current to sustain oscillations during load voltage switching. In another embodiment, which is useful to ensure starting even with low gain transistors and to sustain oscillations during load voltage switching, a center tapped feedback winding is used and the center tap is connected to the common electrodes of the transistors and enough feedback current is drawn from the feedback winding for the desired purpose while the load current is fed back to drive the transistors in accordance with the magnitude of the load.

A more complete understanding of this invention may be had from the detailed description which follows taken with the accompanying drawings in which.

Figure 1:
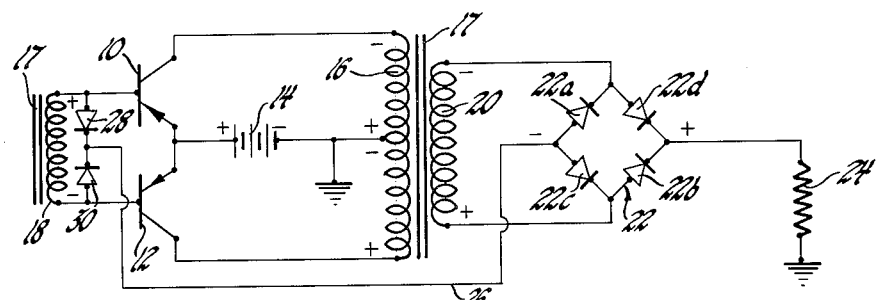
FIGURE 1 is a schematic diagram of an embodiment of the invention wherein load current is fed back through an untapped feedback winding and a pair of auxiliary diodes connected back-to-back.

Referring now to the drawings, there is shown an illustrative embodiment of the invention in a converter circuit adapted to develop a high direct current potential from a low voltage source. In general, the converter circuit comprises an oscillator including a pair of transistors 10 and 12 connected with the primary winding 16 of a transformer 17 through a direct voltage source or battery 14. The transistor input circuits are connected with a feedback winding 18 which provides switching voltages for the transistors. A transformer secondary winding 20 develops an alternating voltage of a desired level which is applied through a bridge rectifier circuit 22 to a load 24. The primary winding 16, secondary winding 20, and feedback winding 18 of the transformer 17 are wound on a common core but for convenience in FIGURES 1, 2 and 3, the feedback winding 18 is illustrated at a location remote from the other windings. The load current is fed back from the rectifier circuit 22 to the transistor input circuits through an improved feedback circuit in accordance with the principles of this invention. In the various embodiments of the invention illustrated in the drawings, the same reference characters are used to designate the same elements.

Considering the converter circuit in more detail with reference to FIGURE 1, the transistors 10 and 12 are suitably of the PNP junction type and are connected in common emitter configuration. The emitter electrodes are connected together and are connected to the positive terminal of the battery 14 which has its negative terminal connected to ground and to the center tap of the primary winding 16. The core of transformer 17 is desirably of the type having a substantially rectangular hysteresis loop but may be suitably constructed of a ferrite material. The collector electrode of the transistor 10 is connected to the upper terminal of the primary winding 16 and the collector electrode of transistor 12 is connected to the lower terminal of the primary winding 16. The base electrodes of the transistors 10 and 12 are connected to opposite end terminals of the feedback winding 18. The secondary winding 20 has its end terminals connected across the input terminals of the output rectifier circuit 22. The output rectifier circuit is a full wave bridge circuit including rectifying devices, such as semiconductor diodes 22a, 22b, 22c and 22d. The positive output terminal of the output rectifier circuit 22 is connected through the load 24 to ground. In order to provide load current feedback to the input circuits of the transistors and to complete the load circuit, a pair of rectifying devices, suitably semiconductor diodes 28 and 30, are connected back-to-back across the feedback winding 18 and the negative output terminal of the rectifier circuit 22 is connected through a conductor 26 to the junction of diodes 28 and 30. In the embodiment of FIGURE 1, it is noted that the feedback winding 18 need not be provided with an intermediate tap and since the full voltage induced in the winding is applied alternately to the base electrodes, in a manner to be described, the number of turns is proportioned accordingly. The phase relationship of the transformer windings is indicated by the polarity symbols in the drawings.

In operation of the converter circuit of FIGURE 1, oscillations are started by a starting bias current which flows from the battery 14 through the emitter and base electrodes in both transistors 10 and 12 and thence through the diodes 28 and 30, through conductor 26 and through the rectifier circuit 22 and the load 24 and then through ground to the negative terminal of the battery. Accordingly, the value of the starting bias current is determined by the magnitude of the load, so starting is assured even when a low resistance or heavy load is applied. The starting bias current will cause one transistor to become somewhat more conductive than the other due to inherent slight differences between the transistors and associated circuits. Assuming that the conduction of transistor 12 predominates and conducts during the first half-cycle, the transistor output circuit from emitter to collector will become increasingly conductive through the lower half of the primary winding 16. By virtue of the inductive coupling with the feedback winding 18, a feedback voltage will be developed with the polarity indicated which causes the base of transistor 12 to become more negative so that transistor 12 becomes fully conductive. At the same time, the positive feedback voltage applied to the base of transistor 10 causes that transistor to become non-conductive. Simultaneously, a voltage with the polarity indicated is developed across the secondary winding 20 and is applied across the input terminals of the rectifier circuit 22. Accordingly, the rectifier circuit develops an output voltage of the polarity indicated which is applied across the load 24.

During the conduction of transistor 12, the voltage induced in the secondary winding 20 back-biases the diodes 22c and 22d and the output voltage is applied to the load through the diodes 22a and 22b. The voltage across the load is the summation of the battery voltage, the feedback winding voltage and the secondary winding voltage and the load current flows from the positive terminal of the battery through the emitter and base electrodes of transistor 12 through the feedback winding 18, diode 28, conductor 26 to the negative output terminal of the bridge circuit 22 and thence through diode 22a, secondary winding 20, diode 22b and through the load to ground and to the negative terminal of the battery. Consequently, the load current flows through the emitter and base electrodes of the transistor 12 to drive the transistor in correspondence with the magnitude of the load.

During the first half-cycle with transistor 12 conducting, the current through the primary winding 16 increases further and the flux increases until the transformer core is saturated causing the voltage induced in the feedback winding and the secondary winding to decrease toward zero. Consequently, the field of the transformer collapses and the voltage in the feedback winding 18 is reversed in polarity causing the transistor 12 to become non-conductive and the transistor 10 to become conductive. This initiates the second half-cycle with current in the output circuit of transistor 10 through the emitter and collector electrode and a voltage induced in the feedback winding, with a polarity opposite that indicated, so that transistor 12 is further cut off and transistor 10 becomes fully conductive. At the same time, a voltage is induced in the secondary winding 20, with a polarity opposite that shown, and is applied to the full-wave rectifier 22 which develops a voltage across its output terminals as indicated. During this half cycle, the load current flows from the battery 14 through the emitter and base electrodes of transistor 10, through the feedback winding 18, diode 30 and conductor 26 to the rectifier circuit 22, and thence through diode 22c, secondary winding 20, diode 22d, and through the load to ground. During this half-cycle, diodes 22a and 22b are back-biased by the secondary voltage and hence are non-conductive. When the transformer reaches saturation, the transistors are switched again and the cycle described is repeated at a frequency which is dependent largely upon the voltage of the battery 14 and the parameters of the transformer. Consequently, an alternating square-wave voltage is developed across the secondary winding 20 with an amplitude determined by the transformer turns ratio and is rectified by the rectifier circuit 22 to develop the direct voltage across the load.

Figure 2:
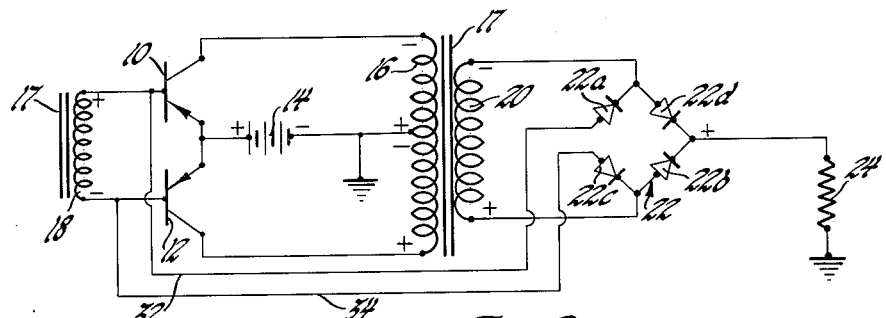
FIGURE 2 is an embodiment of the same type but the diodes of the output rectifier are employed.

In the ambodiment of the invention shown in FIGURE 2, the circuit is somewhat similar to that of FIGURE 1 but the rectifier circuit 22 is "opened up" at its negative output terminal and the anode terminals of the diodes 22a and 22c are connected respectively through conductors 32 and 34 directly to the base electrodes of transistors 10 and 12. In this arrangement, the diodes 22a and 22c are connected back-to-back across the feedback winding 18 through the secondary winding 20 and the auxiliary diodes 28 and 30 of the FIGURE 1 embodiment are deleted.

In operation of the circuit of FIGURE 2, oscillations commence as previously described with transistor 12 conducting during the first half-cycle. The load current flows from the positive terminal of the battery 14 through the emitter and base electrodes of transistor 12 through feedback winding 18, conductor 32, diode 22a, secondary winding 20, and diode 22b, through the load 24 and ground to the negative terminal of the battery. During this half-cycle, the voltage across the secondary winding 20 back-biases the diodes 22c and 22d. When the transformer core reaches saturation, the feedback voltage decreases to zero and reverses polarity and initiates the second half-cycle by causing transistor 10 to become conductive and transistor 12 to be cut off. During this half-cycle, the load current flows from the battery 14 through the emitter and base electrodes of transistor 10, feedback winding 18, conductor 34, diode 22c, secondary winding 20, diode 22d and through the load 24 and ground back to the battery. During this half-cycle, the voltage across secondary winding 20 back-biases the diodes 22a and 22b. Thus, in this embodiment, the load current flows through the input electrodes and provides regenerative feedback current in proportion to the magnitude of the load.

Figure 3:
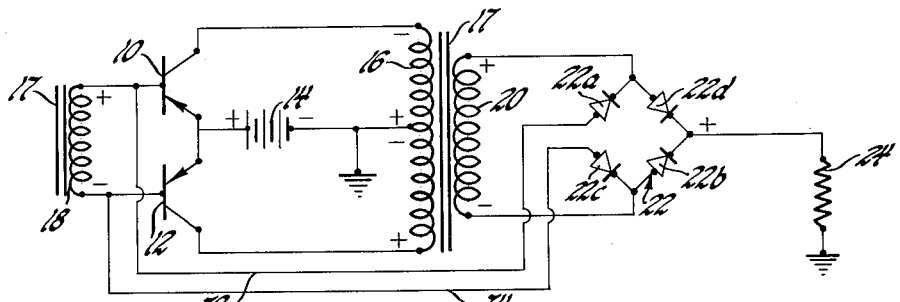
FIGURE 3 shows an embodiment wherein feedback current is excluded from the feedback windings.

The embodiment of the invention shown in FIGURE 3 is similar to that of FIGURE 2 but the load current which serves as the regenerative feedback current is excluded from the feedback winding 18 by reversing the relative winding direction of the secondary winding 20. Thus the feedback winding is required only to furnish an open circuit voltage for switching the transistors. The feedback winding voltage is not added to the battery and secondary winding voltage across the load. In operation with transistor 12 conducting during one half-cycle, the voltage induced across the secondary winding 20 has the polarity indicated and hence the diodes 22a and 22b are back-biased. Consequently, the load current flows from the battery through the emitter and base electrodes of transistor 12, conductor 34, diode 22c, secondary winding 20, diode 22d and through the load 24 to ground and back to the battery. When transistor 10 is conducting on the alternate half-cycle, the voltage induced across the secondary winding 20 is opposite the polarity shown and diodes 22c and 22d are back-biased. Accordingly, the load current flows from the battery through the emitter and base electrodes of transistor 10, conductor 32, diode 22a, secondary winding 20, diode 22b, and through the load and ground back to the battery. Since the secondary winding 20 is phased so that the induced voltage, during the conduction of one transistor, back-biases the diode connected with the junction of the feedback winding and the base electrode of the other transistor, the load current suppling regenerative feedback is excluded from the feedback winding.

Figure 4:
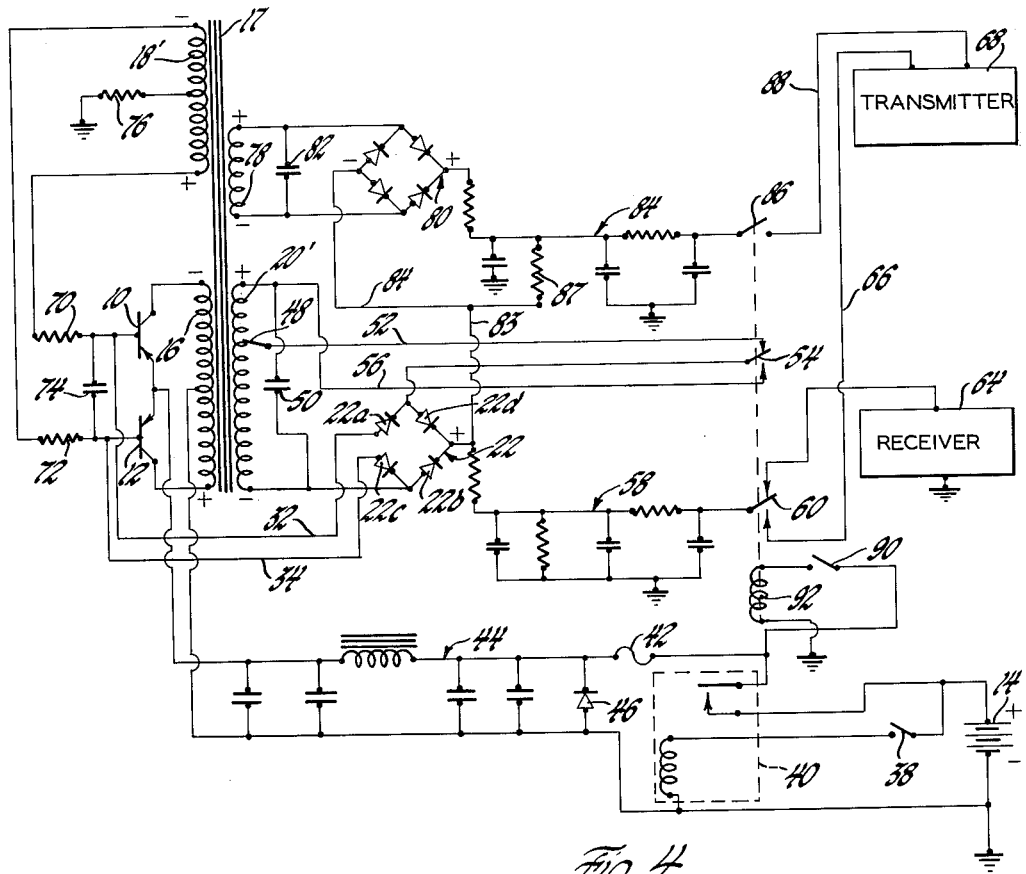
FIGURE 4 shows an embodiment wherein the converter circuit supplies plural loads with different voltages.

Referring now to FIGURE 4, there is shown an embodiment of the invention especially adapted as a power supply for a radiotelephone including a transmitter 68 and a receiver 64 requiring two or more different values of plate supply voltages. This embodiment of the invention utilizes a circuit similar to that of FIGURE 3 with special provisions to ensure that oscillations are sustained during switching of the output voltage from one value to another and to protect the transistors from destructive switching transients. This circuit includes transistors 10 and 12 connected with the transformer primary winding 16 and energized by a battery 14. A feedback winding 18' provides switching voltages for the transistors and its end terminals are connected with the base electrodes of transistors 10 and 12 through resistors 70 and 72, respectively. A condenser 74 is connected across the base electrodes and together with the resistors, which are of relatively high value, forms a de-spiking network to protect the transistors from switching transients. The center tap of the feedback winding 18' is connected to ground through a current limiting resistor 76 to provide a forward bias current path for the input electrodes of the transistors. The battery has its negative terminal connected to ground and its positive terminal is connected through the contacts of a control relay 40 and a fuse 42 and a filter 44 to the center tap of the primary winding 16. The transistor circuit is energized by an on-off switch 38 connected in series with the winding of the control relay 40 across the battery 14. A diode 46 is connected in shunt across the supply lines to provide a short circuit through the fuse 42 to protect the transistors 10 and 12 in the event the battery is connected with the wrong polarity.

In order to provide a low value of plate supply voltage, a secondary winding 20' having an intermediate tap 48 is provided. A buffer condenser 50 is connected across the end terminals of the secondary winding. The lower terminal of the secondary winding 20' is connected to one input terminal of the bridge rectifier circuit 22 and the intermediate tap 48 is connected through a conductor 52 to the upper fixed contact of a voltage selector switch 54 and through the movable contact thereof to the other input terminal of the rectifier circuit. The positive output terminal of the rectifier circuit 22 is connected through a filter 58 to the movable contact of a load selector switch 60. In order to complete the load current circuit and provide regenerative feedback with the load current, the other output terminal of the bridge 22 is "opened up" and the anodes of diodes 22a and 22c are connected to the base electrodes of transistors 10 and 12 through conductors 32 and 34, respectively, as in the circuit of FIGURE 3. Accordingly, when the movable contact of voltage selector switch 54 is closed against the upper fixed contact, a low value of plate supply voltage is developed across the movable contact of the load selector switch 60 and ground.

In order to provide an intermediate value of plate supply voltage, the upper terminal of the secondary winding of the transformer 20' is connected through a conductor 56 to the lower fixed contact of the voltage selector switch 54 and through the movable contact thereof to the upper input terminal of the rectifier circuit 22. Consequently, with the movable contact of the voltage selector switch closed against the lower fixed contact, an intermediate value of plate supply voltage is developed across the load selector switch 60 and ground.

To provide a high value of plate supply voltage, an additional secondary winding 78 is provided on the transformer 17 and connected across the input terminals of a bridge rectifier circuit 80. A buffer condenser 82 is connected across the secondary winding 78. The rectifier 80 is connected in cascade with the rectifier 22, so that the direct voltages are additive, by connection of the positive output terminal of rectifier circuit 22 with the negative output terminal of rectifier 80 through conductors 83 and 84. The other output terminal of the rectifier circuit 80 is connected through a filter 84 to the movable contact of an additional selector switch 86. A bleeder resistor 87 is connected between the conductor 83 and an intermediate point on the filter 84 to provide a discharge path for the condensers of the filter. A high value of plate supply voltage is developed between the movable contact of selector switch 86 and ground as the sum of the voltages developed across rectifier circuits 22 and 80.

For the selective energization of the receiver 64 and the transmitter 68, a "push-to-talk" switch 90 is connected in series with a control relay 92 across the battery 14. The relay 92 has its armature operatively connected with the selector switches 54, 60 and 86 for simultaneous actuation thereof. When the push-to-talk switch 90 is open, the relay 92 is deenergized and the movable contacts of the selector switches are in the upper positions to energize the receiver and conversely when the push-to-talk switch is closed, the movable contacts are in their lower positions to energize the transmitter.

In operation of the embodiment of FIGURE 4, the converter circuit is energized by closing the on-off switch 38 which in turn energizes the control relay 40 to connect the positive terminal of the battery to the center tap of the primary winding 16. With the push-to-talk switch 90 open, the voltage selector switch 54 is in the position shown and connects the intermediate tap 48 of secondary winding 20' to the upper input terminal of the rectifier circuit 22 to develop the low value of plate supply voltage which is applied through selector switch 60 to the receiver 64. A starting current is supplied between the emitter and base electrodes of transistor 12 from the battery 14 and flows through the conductor 34, diodes 22c and 22b, filter 58, selector switch 60 and receiver 64 to ground and thence to the negative terminal of the battery. Similarly, starting current will be supplied from the positive terminal of the battery 14 through the emitter and base electrodes of transistor 10, conductor 32, diodes 22a and 22d, filter 58, selector switch 60 and receiver 64 to ground and back to the negative terminal of the battery. This starting current is proportional to the value of the load presented by the receiver. Additionally, starting current of relatively small magnitude will flow from the positive terminal of the battery through the emitter and base electrodes of transistor 12, resistor 72, the upper half of feedback winding 18' and resistor 76 to ground and thence to the negative terminal of the battery. Similarly, a small amount of starting current will flow through the emitter and base electrodes of transistor 10, resistor 70, the lower half of feedback winding 18' and resistor 76 to ground. Consequently, oscillations build up in the transistor oscillator and during the half-cycle when transistor 12 is conductive, voltages of the relative polarity indicated across the transformer windings are developed and during the alternate half-cycle when transistor 10 is conductive, the voltages reverse in polarity. The load current supplied to the receiver 64 is fed back in a regenerative sense to the conductive transistor in the same manner as described with reference to the circuit of FIGURE 3 to provide driving power corresponding to the magnitude of the load. The phase or relative polarity of the secondary winding with reference to the feedback winding is such that the load current is excluded from the feedback winding. Consequently, the resistors 70 and 72 of the de-spiking network may be of relatively high value.

When the push-to-talk switch 90 is closed to energize the transmitter 68, the voltage selector switch 54 is closed against the lower fixed contact and the intermediate value of plate supply voltage is applied through the load selector switch 60 and conductor 66 to the transmitter. At the same time, the selector switch 86 is closed and the high value of plate supply voltage, developed as the sum of the voltage across rectifiers 22 and 80, is applied to the transmitter through conductor 88. During this switching interval, the load on the converter circuit is effectively removed and consequently, the load current is momentarily reduced to zero. The condensers in filters 58 and 84 remain charged and back-bias the diodes of rectifier circuits 22 and 80 respectively. Since the load current feedback circuit is interrupted, the oscillator would stop oscillating and remain idle until the filter condensers discharge to a value less than the battery voltage unless special provision is made to sustain oscillations during this switching interval. For this purpose, the feedback winding center tap circuit through resistor 76 is provided to supply a sufficient forward bias current from the battery to the transistors to maintain oscillations during no load conditions.

Figure 5:
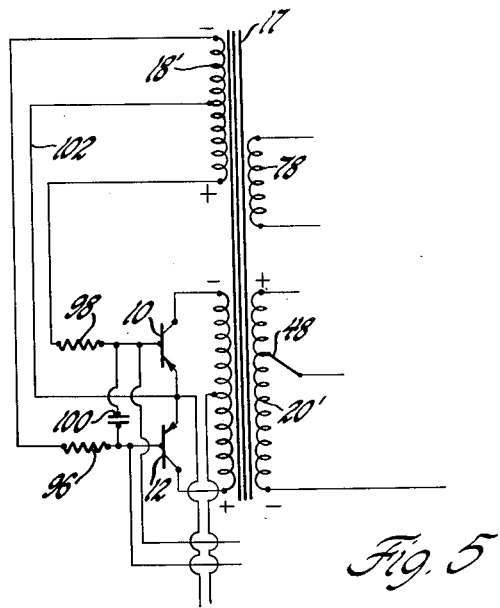
FIGURE 5 shows a modification of the circuit of FIGURE 4 in which the feedback winding supplies a part of the feedback current to the transistors.

The embodiment of the invention shown in FIGURE 5 is similar to that of FIGURE 4 and only a portion of the schematic diagram is shown to illustrate the differences. The circuit of FIGURE 5 is especially adapted to ensure starting of the oscillator and maintenance of oscillations during the switching interval by permitting the feedback winding to supply a small amount of current in addition to the load current feedback. For this purpose, the feedback winding 18' has its upper terminal connected through a resistor 96 to the base electrode of transistor 12 and its lower terminal connected through a resistor 98 to the base electrode of transistor 10. A condenser 100 is connected across the base electrodes and together with the resistors 96 and 98 forms a despiking network for transistor protection. The feedback winding 18' is provided with a center tap which is connected through a conductor 102 to the emitter electrodes of the transistors. The resistors 96 and 98 are of relatively small value to permit sufficient current to flow in the feedback winding due to the induced feedback voltage to sustain oscillations during load switching and to ensure oscillator starting under load even with low gain transistors. It is noted, however, that the relative winding direction of the feedback winding 18 and the secondary winding 20' is such that the load current is excluded from the feedback winding by virtue of the back-bias voltages applied to diodes 22a and 22c as described with reference to the circuit of FIGURE 3. Otherwise, the circuit configuration and operation are the same as that of FIGURE 4.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A converter circuit comprising a pair of transistors each having input, output and common electrodes, a transformer having a primary winding with an intermediate tap, a feedback winding, and a secondary winding, an output circuit for the transistors including the primary winding connected between the output electrodes and a direct voltage source connected between the intermediate tap of the primary winding and the common electrodes, and input circuit for the transistors for switching the transistors alternately on and off whereby an alternating voltage is induced in the secondary winding, said input circuit including the feedback winding connected between the input electrodes, first and second rectifying devices, the terminals of the feedback winding being connected through said first and second rectifying devices with the same polarity to respective terminals of the secondary winding, third and fourth rectifying devices connected with opposite polarity across the terminals of the secondary winding, a load device connected between the junction of the third and fourth rectifying devices and the common electrodes, whereby a first series circuit extends through the secondary winding, the third rectifying device, the load device, the common and input electrodes of one transistor and the first rectifying device, and a second series circuit extends through the secondary winding, the fourth rectifying device, the load device, the common and input electrodes of the second transistor, and the second rectifying device, said rectifying devices and common and input electrodes having the same forward conduction direction in each series circuit so that both half cycles of said alternating voltage cause a unidirectional current through said load device and a feedback current to the conductive transistor that corresponds to the magnitude of the load.

2. A converter circuit comprising a pair of transistors each having base, collector and emitter electrodes, a transformer having a primary winding with a center tap, a feedback winding, and a secondary winding, an output circuit for the transistors including the primary winding connected between the collector electrodes and a battery connected between the center tap of the primary winding and the emitter electrodes, an input circuit for the transistors for switching the transistors alternately on and off whereby an alternating voltage is induced in the secondary winding, said input circuit including the feedback winding connected between the base electrodes, first and second rectifying devices, the terminals of the feedback winding being connected through said first and second rectifying devices with the same polarity to respective terminals of the secondary winding, third and fourth rectifying devices connected back-to-back across the terminals of the secondary winding, a load device connected between the junction of the third and fourth rectifying devices and the emitter electrodes, whereby first series circuit extends through the secondary winding, the third rectifying device, the load device, the emitter and base electrodes of one transistor and the first rectifying device, and a second series circuit extends through the secondary winding, the fourth rectifying device, the load device, the emitter and base electrodes of the second transistor, and the second rectifying device, said rectifying devices and base and emitter electrodes having the same forward conduction direction in each series circuit so that both half cycles of said alternating voltage cause a unidirectional current through said load device and cause a feedback current to the conductive transistor that corresponds to the magnitude of the load.

3. A converter circuit comprising a pair of transistors each having input, output and common electrodes, a transformer having a primary winding with an intermediate tap, a feedback winding, and a secondary winding, an output circuit for the transistors including the primary winding connected between the output electrodes and a direct voltage source connected between the intermediate tap of the primary winding and the common electrodes, an input circuit for the transistors for switching the transistors alternately on and off whereby an alternating voltage is induced in the secondary winding, said input circuit including the feedback winding connected between the input electrodes, first, second, third, and fourth rectifying devices, a load device having one terminal connected to the common electrodes, one terminal of the feedback winding being connected to the other terminal of the load device through said first and fourth rectifying devices in series relation, the other terminal of the feedback winding being connected to said other terminal of the load device through said second and third rectifying devices connected in series relation, said secondary winding being connected between the junction of the first and fourth rectifying devices and the junction of the second and third rectifying devices, whereby a first series circuit extends through the secondary winding, the third rectifying device, the load device, the common and input electrodes of one transistor and the first rectifying device, and a second series circuit extends through the secondary winding, the fourth rectifying device, the load device, the common and input electrodes of the second transistor, and the second rectifying device, said rectifying devices and common and input electrodes having the same forward conduction direction in each series circuit so that both half cycles of said alternating voltage cause a unidirectional current through said load device and a feedback current to the conductive transistor that corresponds to the magnitude of the load.

4. The converter circuit defined in claim 3 wherein the secondary winding and the feedback winding have opposite winding directions so that the voltage induced in the secondary winding back-biases the first and second rectifying devices alternately to connect the feedback winding in said first and second series circuits whereby the voltage induced in the feedback winding is added to the alternating voltage induced in the secondary winding.

5. The converter circuit defined in claim 3 wherein the secondary winding and the feedback winding have same winding directions so that the voltage induced in the secondary winding back-biases the first and second rectifying devices alternately to exclude the feedback winding from said first and second series circuits whereby the current to the load device is shunted around the feedback winding.

6. The converter circuit defined in claim 3 wherein the secondary winding and the feedback winding have the same winding directions so that the voltage induced in the secondary winding back-biases the first and second rectifying devices alternately to exclude the feedback winding from said first and second series circuits whereby the current to the load device is shunted around the feedback winding, and including first and second resistors connected respectively between the input electrodes of the transistors and the feedback winding, and a condenser connected between said input electrodes, said resistors and condenser forming a de-spiking network for protection of the transistors against switching transients.

7. A converter circuit comprising a pair of transistors each having base, collector and emitter electrodes, a transformer having a primary winding with a center tap, a feedback winding, and a secondary winding, an output circuit for the transistors including the primary winding connected between the collector electrodes and a battery connected between the intermediate tap of the primary winding and the emitter electrodes, an input circuit for the transistors for switching the transistors alternately on and off whereby an alternating voltage is induced in the secondary winding, said input circuit including the feedback winding connected between the input electrodes, first, second, third, and fourth rectifying devices, a load device having one terminal connected to the emitter electrodes through the battery, one terminal of the feedback winding being connected to the other terminal of the load device through said first and fourth rectiyfing devices in series relation, the other terminal of the feedback winding being connected to said other terminal of the load device through said second and third rectifying devices connected in series relation, said secondary winding being connected between the junction of the first and fourth rectifying devices and the junction of the second and third rectifying devices, whereby a first series circuit extends through the secondary winding, the third rectifying device, the load device, the emitter and base electrodes of one transistor and the first rectifying device, and a second series circuit extends through the secondary winding, the fourth rectifying device, the load device, the emitter and base electrodes of the second transistor, and the second rectifying device, said rectifying devices and common and input electrodes having the same forward conduction direction in each series circuit so that both half cycles of said alternating voltage cause a unidirectional current through said load device and a feedback current to the conductive transistor that corresponds to the magnitude of the load.

8. A converter circuit comprising a pair of transistors each having input, output and common electrodes, a transformer having a primary winding with an intermediate tap, a feedback winding, and a secondary winding, an output circuit for the transistors including the primary winding connected between the output electrodes and a direct voltage source connected between the intermediate tap of the primary winding and the common electrodes, an input circuit for the transistors for switching the transistors alternately on and off whereby an alternating voltage is induced in the secondary winding, a full wave rectifier circuit having its input terminals connected across the secondary winding; said input circuit including the feedback winding connected between the input electrodes, a pair of diodes connected back-to-back across the feedback winding, a load device, one output terminal of the rectifier being connected through the load device to the intermediate tap of the primary winding and the other output terminal of the rectifier circuit being connected to the junction of said diodes.

9. A converter circuit comprising a pair of transistors each having input, output and common electrodes, a transformer having a primary winding with an intermediate tap, a feedback winding, and a secondary winding, an output circuit for the transistors including the primary winding connected between the output electrodes and a direct voltage source connected between the intermediate tap of the primary winding and the common electrodes, an input circuit for the transistors for switching the transistors alternately on and off whereby an alternating voltage is induced in the secondary winding, a full wave rectifier including two pairs of oppositely poled rectifying devices connected in a bridge circuit, said rectifier having its input terminals connected across the secondary winding; said input circuit including the feedback winding connected between the input electrodes and connected between one oppositely poled pair of rectifying devices in the bridge circuit, a load device, the junction of the other pair of oppositely poled rectifying devices being connected through the load device to the intermediate tap of the primary winding.

10. A converter circuit comprising a pair of transistors each having input, output and common electrodes, a transformer having a primary winding with an intermediate tap, a feedback winding, and a secondary winding, an output circuit for the transistors including the primary winding connected between the output electrodes and a direct voltage source connected between the intermediate tap of the primary winding and the common electrodes, an input circuit for the transistors for switching the transistors alternately on and off whereby an alternating voltage is induced in the secondary winding, a full wave rectifier including two pairs of oppositely poled rectifying devices connected in a bridge circuit, said rectifier having its input terminals connected across the secondary winding; said input circuit including the feedback winding connected between the input electrodes and connected between one oppositely poled pair of rectifying devices in the bridge circuit, a load device, the junction of the other pair of oppositely poled rectifying devices being connected through the load device to the intermediate tap of the primary winding, said secondary winding and said feedback winding being connected in opposed relation with reference to said one oppositely poled pair of rectifying devices so that they are alternately back-biased by the voltage induced in the secondary winding to exclude the load current from the feedback winding.

11. The converter circuit defined in claim 10 including a pair of resistors connected respectively between said input electrodes and the terminals of the feedback winding, and a condenser connected across the input terminals to form a de-spiking network for the protection of the transistors against transient voltages.

12. The converter circuit defined in claim 10 including a center tap on the feedback winding, a resistor connected between the center tap and the intermediate tap of the primary winding to provide bias current for the transistors and sustain oscillations during no load conditions, a pair of resistors connected respectively between said input electrodes and the terminals of the feedback winding, and a condenser connected across the input terminals, whereby said pair of resistors and condensers form a de-spiking network for the protection of the transistors against transient voltages.

13. The converter circuit defined in claim 10 including a center tap on the feedback winding connected to said common electrodes whereby feedback current is supplied to the transistors from the feedback winding, a pair of resistors connected respectively between said input electrodes and the terminals of the feedback winding, and a condenser connected across the input terminals to form a de-spiking network for the protection of the transistors against transient voltages.

No references cited.